M. A. HOWE.
Churn.
No. 203,047. Patented April 30, 1878.
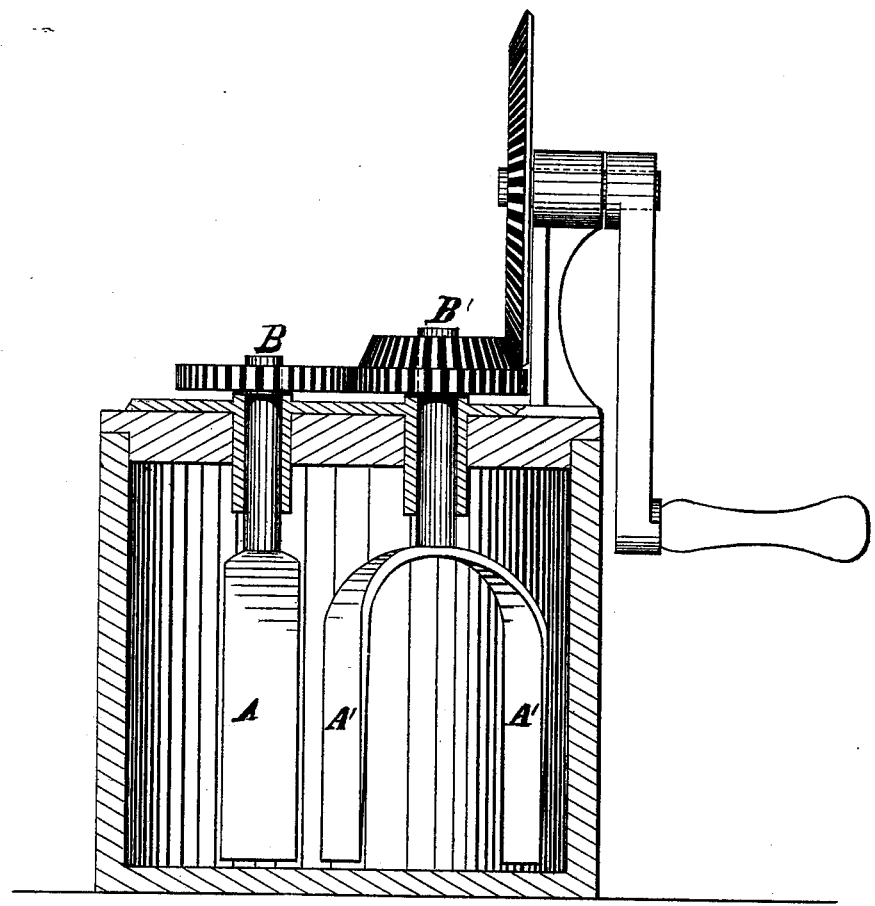
Witnesses
H. F. Willson,
C. S. Lilly.
Inventor,
Moses A. Howe.

UNITED STATES PATENT OFFICE.

MOSES A. HOWE, OF ELYRIA, OHIO, ASSIGNOR OF ONE-HALF HIS RIGHT TO O. BOWEN, OF SAME PLACE.

IMPROVEMENT IN CHURNS.

Specification forming part of Letters Patent No. 203,047, dated April 30, 1878; application filed October 5, 1877.

*To all whom it may concern:*

Be it known that I, MOSES A. HOWE, of Elyria, in the county of Lorain and State of Ohio, have invented certain new and useful Improvements in Churns; and I do hereby declare that the following is a full and exact description thereof, reference being had to the accompanying drawings, and to the letters of reference marked thereon, in which like letters refer to like parts in the different figures.

To enable others skilled in the arts to make and use my invention, I will proceed to describe its construction and operation.

The nature of my invention consists in the construction and arrangement of two sets of tangential blades formed on two parallel axles, and rotating with equal velocity in opposite directions. Said axles are so arranged in relation to each other that a transverse section of the circular motion of one set crosses that of the other.

In the drawings, A A A' A' represent the tangential blades, which are formed on the lower ends of revolving axles B B'. Said axles are secured in suitable bearings, and are geared together by pinions of equal diameter. A continuous rotary motion is communicated to them by means of a bevel-wheel and pinion.

Axles B B', when revolved, impart to the blades a circular motion, and said blades, being set tangential to the circle of their movement, cause strong and conflicting currents to so impinge upon and intermingle with each other, without breaking or causing spray, that the desired temperature is rapidly attained with a comparatively small outlay of physical force. Thus much hard and disagreeable labor is obviated, and, there being absolutely no spray, the milk is therefore all uniformly agitated, and the butter in every part of the churn is produced simultaneously; hence it is uniform in quality, no part being over-churned, so as to render it pasty, while other particles remain unconverted cream, which is the prolific source of rancid butter. The cover to which these revolving blades are secured may be adjusted to any desirable form of a churn.

I am aware that churns have been constructed wherein two sets of revolving dashers have been used. They are all constructed, however, with broad flat radial paddles, which have a tendency to move the entire mass of cream instead of easily cutting through it. I do not therefore claim two sets of revolving dashers; but What I do claim as new, and desire to secure by Letters Patent, is—

In a churn, the combination of U-shaped pendent dashers, each formed of a single bar reduced in thickness from above downward, and terminating in close proximity to the bottom of the churn, the said dashers being arranged tangential to their circle of revolution, and caused to revolve in opposite directions, so that the movement of one dasher will intersect that of the other, substantially in the manner and for the purpose described.

MOSES A. HOWE.

Attest:
H. F. WILLSON,
C. S. LILLY.